United States Patent [19]

Meixner

[11] Patent Number: 5,375,331
[45] Date of Patent: Dec. 27, 1994

[54] KNIFE WITH BLADE MOVED IN RAPID SEQUENCE RELATIVE TO THE HANDLE

[75] Inventor: Hans-Werner Meixner, Wettenberg, Germany

[73] Assignee: Pi-Patente Gesellschaft mit beschraenkter Haftung (GmbH), Wettenberg, Germany

[21] Appl. No.: 27,522

[22] Filed: Mar. 8, 1993

[30] Foreign Application Priority Data

Sep. 8, 1990 [DE] Germany .................. 4028579

[51] Int. Cl.5 .................................. B26B 7/00
[52] U.S. Cl. ......................... 30/275.4; 30/277.4
[58] Field of Search ............. 30/277.4, 272.1, 277, 30/275.4, 394; 173/211

[56] References Cited

U.S. PATENT DOCUMENTS

| 2,078,924 | 5/1937 | Clerk | 173/211 |
| 3,053,231 | 9/1962 | Fairchild | 173/211 X |
| 3,203,095 | 8/1965 | Nelson | 30/277.4 |
| 3,308,535 | 3/1967 | Freeman et al. | 30/277.4 |
| 3,995,369 | 12/1976 | Duff | 30/228 |
| 4,644,653 | 2/1987 | Bacon et al. | 30/277.4 X |
| 4,712,596 | 12/1987 | McClaran | 83/811 X |
| 5,218,767 | 6/1993 | Wells | 30/277.4 |

FOREIGN PATENT DOCUMENTS

| 124038 | 5/1947 | Australia | 30/277 |
| 0241385 | 10/1987 | European Pat. Off. . | |
| 1512620 | 1/1968 | France . | |
| 2410540 | 6/1979 | France . | |
| 6943298 | 11/1969 | Germany . | |
| 8908775 | 11/1989 | Germany . | |
| 224265 | 11/1942 | Switzerland . | |

Primary Examiner—Richard K. Seidel
Assistant Examiner—Kenneth E. Peterson
Attorney, Agent, or Firm—Foley & Lardner

[57] ABSTRACT

A knife consisting of a blade with a tang which is mounted in a handle. A guide, preferably made of plastic, in which the tang can be quickly moved to and fro by an oil-pressurized piston against the pressure of at least one spring, is provided in the handle. The piston runs in a cylinder provided in the handle of the knife. The oil line is connected with a central station located some distance away.

45 Claims, 6 Drawing Sheets

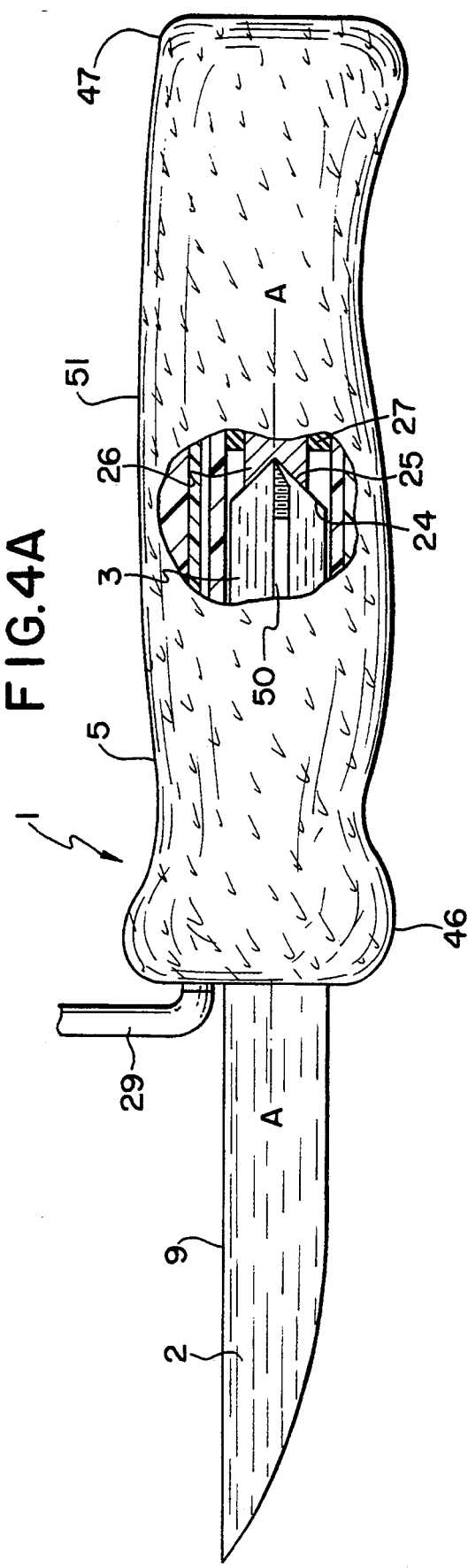
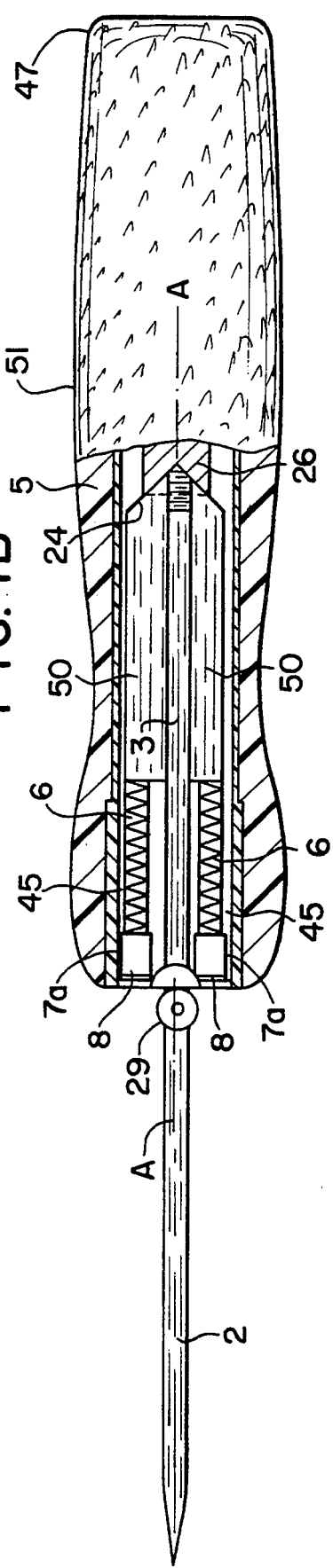

KNIFE WITH BLADE MOVED IN RAPID SEQUENCE RELATIVE TO THE HANDLE

BACKGROUND OF THE INVENTION

The invention relates to a knife with blade that moves relative to the handle. The demand made on a knife with a driven blade is that it substantially reduces the necessary expenditure of force when cutting a product compared with knives with a non-driven blade and thus also the time involved, for example when boning a slaughtered animal.

In the case of a knife belonging to the prior art (DE-GM 89 08 775 U1), the driven blade is attached to the working piston outside the knife handle. This results in insecure guidance when using the knife, because a pressure is exerted on the blade in the cutting process which tends to press the blade out of its path. The number of tasks which can be performed with such a knife is thus limited, for only a straight cut is feasible with such a knife but no curved cutting as is required, for example, for boning a slaughtered animal. In order to save weight in this knife, the blade of this knife is moreover of very thin design, as a result of which the poor guidance characteristic of the knife is further increased. For this reason a support for the blade is provided, which is also located outside the knife and therefore substantially disturbs the use of the knife, because this support comes into contact with the meat in the cutting process and bruises it.

A knife with a driven blade according to CH-PS 224 265 is also known, in which the blade is driven by means of an electromagnet. The guide of the blade is located in the handle of this knife, but kept extremely short, as a result of which the blade has no secure bearing, so that the same disadvantages occur as in the knife mentioned above, namely that it cannot be securely guided. Furthermore, in the case of the knife according to CH-PS 224 265, the entire drive must be dismantled from the handle in order to change the blade, which is complex and time-consuming, especially as the blades must be frequently reground when the knife is used for commercial purposes, for example for boning a slaughtered animal, because they are subject to heavy wear and have to be replaced.

The electromagnetic drive moreover does not permit the blade to be driven with great force unless a correspondingly large magnet is selected. Such a large magnet, however, makes the knife unwieldy on account of its volume and is much too heavy.

According to EP 0 241 385 A1, a knife with a blade moved in a chisel-like way is known, which is used mainly for opening shellfish. In the case of this knife, the blade is to execute strong thrusting movements in one direction, namely away from the knife handle.

The thrusting movements are effected by a piston which can be moved to and fro by air-pressure fluctuations, which strikes, when the blade is in working position, against an anvil which is permanently connected with the blade and moves the latter forward in thrust direction.

This knife is not intended for cutting, for example for boning slaughtered animals, because a pressing movement in axial direction of the blade is implied in this case but the load on the blade is transverse to this direction of motion when the knife is being used for cutting.

Knives for cutting purposes normally have a tang located in the handle of the knife.

Among the professional public and according to the invention, the term "tang" is understood as an extension of the blade, normally in the form of the blade, which extends into the inside of the knife handle and acts there as a fixing medium. In the context of the invention, the effect of the provided tang is that the blade moves in a stable and secure manner to and fro in the special guide provided in the handle of the knife.

This secure and stable guidance of the tang according to the invention cannot be attained by attaching the blade directly to the anvil according to EP 0 241 385 A1 with the functional efficiency striven for by the invention.

Furthermore, measures for replacing the blade are not to be drawn from EP 0 241 385 A1. Obviously the entire knife must be dismantled for this purpose, so that the same disadvantages occur as in the knife according to CH-PS 224 265.

SUMMARY OF THE INVENTION

It is thus an object of the invention to provide a knife with the dimensions/volume and the approximate weight of a knife with a stationary blade, which has, however, a blade moving rapidly with great force without vibrating too strongly (low-vibration), in which the blade with tang can be easily detached and easily replaced with the driving media provided inside the handle, with safe, stable guidance.

This object is solved by a knife comprising a handle including a guide and a piston; a blade moveable in rapid succession relative to the handle, wherein the blade includes a tang which is moveable to and fro in an axial direction in the guide of the handle by the piston, the tang having wings and being supported with its rear part on the piston driven by means of a pressure medium; and at least one counterpressure spring supported with one end on an end of at least one wing of the tang and with an opposite end at a threaded fitting of the handle.

It was found that the cutting process is enhanced by the configuration according to the invention. In particular, the same effort as hitherto is no longer required to guide the knife through the substance to be separated.

The drive of the blade provided in the handle of the knife is advantageously a hydraulic drive. The drive is executed at the end of the tang. The support of the tang can, in contrast, be provided in the front part of the handle. The tang and the guide can therefore be of long design so that any twisting of the tang in the guide and thus a migration of the blade in lateral or vertical direction becomes impossible. The part of the tang located between these points of application, the power transmission onto the tang and the support of the tang, is located in almost its entire length in the guide of the tang.

A food-compatible oil can be used as a driving medium to permit the knife to be used in the field of food processing.

The driving medium oil for the movement to and fro of the knife blade guarantees moveover that the knife can be inserted in a water bath without a hazardous electric shock having to be feared.

One essential advantage of the configuration according to the invention is seen in the fact that the knife has good gripping properties and is of lightweight design and almost vibration-free, so that fatigue symptoms do not occur in the user even with longer use. Such fatigue symptoms are customary when handling knives with a non-driven blade, because the cutting pressure has to be exerted manually in this case. In the case of knives with a driven blade according to the prior art, the knives are heavy and vibrate very strongly on account of the drive. Fatigue symptoms therefore occur in the user. On account of the limited performance of the drive of knives according to the prior art, only lightweight blades can be used, so that there is a constant risk of the blade bending in the cutting process. The drive according to the invention permits only part of the overall drive to be accommodated in the handle and the other part to be provided outside the knife without the performance of solid blades being impaired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiment given below, serve to explain the principles of the invention.

FIGS. 4a and 4b show a view of the knife partially broken open;

DETAILED DESCRIPTION OF THE PREFERRED EMBODIMENTS

Figure 1:
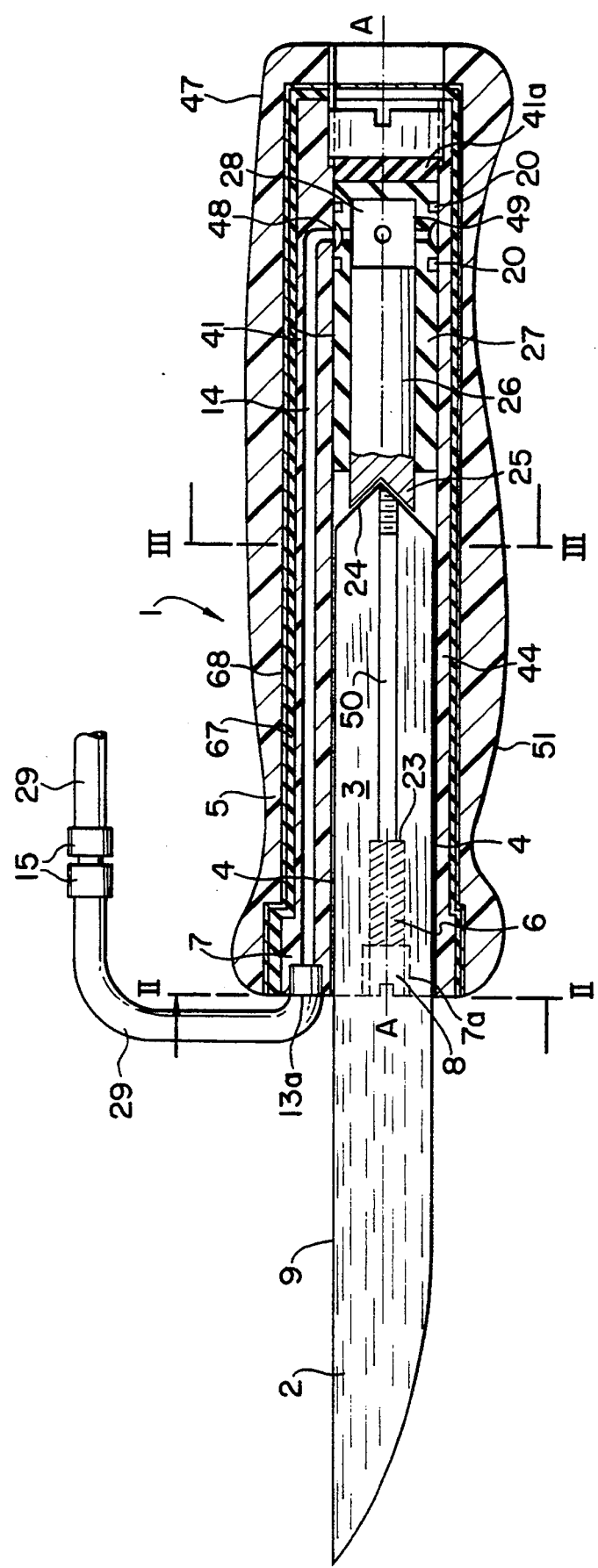
FIG. 1 shows the knife in longitudinal section.

As shown in FIG. 1, the knife generally designated with (1) has a blade (2) which is connected with a tang (3). The blade (2) and tang (3) consist for example advantageously of one piece, which is, however, not compulsory. The tang (3) has according to FIGS. 2 and 3 a rectangular cross-section. In its end region it has wings or stay bolts (50) positioned at right angles. The tang (3) and wings (50) are mounted axially movably in a guide (4). The guide (4) is lined with or made of a blocking resistant plastic. Such a plastic coating may, however, also be applied to the tang (3) and the wings (50). Alternatively, the tang and wings themselves are provided with a blocking-resistent plastic material. In one preferred embodiment, the blocking-resistant plastic material is TEFLON.

Counterpressure springs (6) located on either side of the tang (3) press onto the wings (50) of the tang (3). The counterpressure springs (6) are located in the front part of the handle (5) and are supported in a recess (23) of a threaded fitting (7) or at grub screws (8) engaging in the recess (23). The preliminary tension of the counterpressure springs (6) can be set by means of the grub screws (8). The grub screws (8) are located in threaded holes (7a) which are provided on either side of a slot (45) for the emergence of the tang (3) in the threaded fitting (7).

On assembly, the counterpressure springs (6) and also the wings (50) of the tang (3) can be inserted through the threaded holes (7a) for the grub screws (8). The threaded holes (7a) engage for this purpose down into the slot (45), i.e. the external surfaces of the slot (45) form in the threaded hole (7a) a secant which is so long that the wings (50) can be easily pushed through. The threaded holes (7a) themselves are larger in their diameters than the diameter of the counterpressure springs (6) in order to be able to lead the latter through the threaded holes (7a) into the handle (5).

For assembly purposes, the tang (3) with wings (50) is pushed through the slot (45) and the threaded holes (7a), then the counterpressure springs (6) are led through the threaded holes (7a) and finally the grub screws (8) are screwed in. Dismantling is done in the reverse sequence.

The counterpressure springs (6) can be helical springs. However, cup springs, especially cup spring assemblies, may be provided instead of the helical springs.

The tang (3) and the wings (50) taper down at the rear end (24) centrically to the tang (3), i.e. with a point in the center line (A—A) of the tang (3). The tapered or pointed end (24) is supported in a recess (25) of the piston (26) which is also tapered with a somewhat larger opening angle than the tip of the tang (3). The counterpressure springs (6) thus always press the tang (3) centrically against the piston (26) via the wings (50).

The movement to and fro of the blade (2) is initiated by the piston (26) which runs in a working cylinder (27). The working cylinder (27) is carried by a first mount (41) in the handle (5) of the knife. The holding fixture located in an axial direction behind the working cylinder (27) consists of a flexible element such as rubber buffer (41a) in order to intercept the vibrations initiated by the hydraulic pressure in the working cylinder (27) and by the counterpressure springs (6). In the working area (28) of the working cylinder (27) oil is located, on which excess pressure is exerted for the purpose of forward movement of the piston (26) or a partial vacuum for the purpose of reverse movement, whose negative moment of force is supported by the counterpressure springs (6).

The guide (4), the working cylinder (27) and the space for the counterpressure springs (6) are enclosed by a layered casing (66), whereby the inner layer (67) consists for example of soft rubber and the outer layer of a food-compatible relatively hard plastic skin (68). This configuration effects further damping of the vibrations as well as noise damping.

Figure 5:
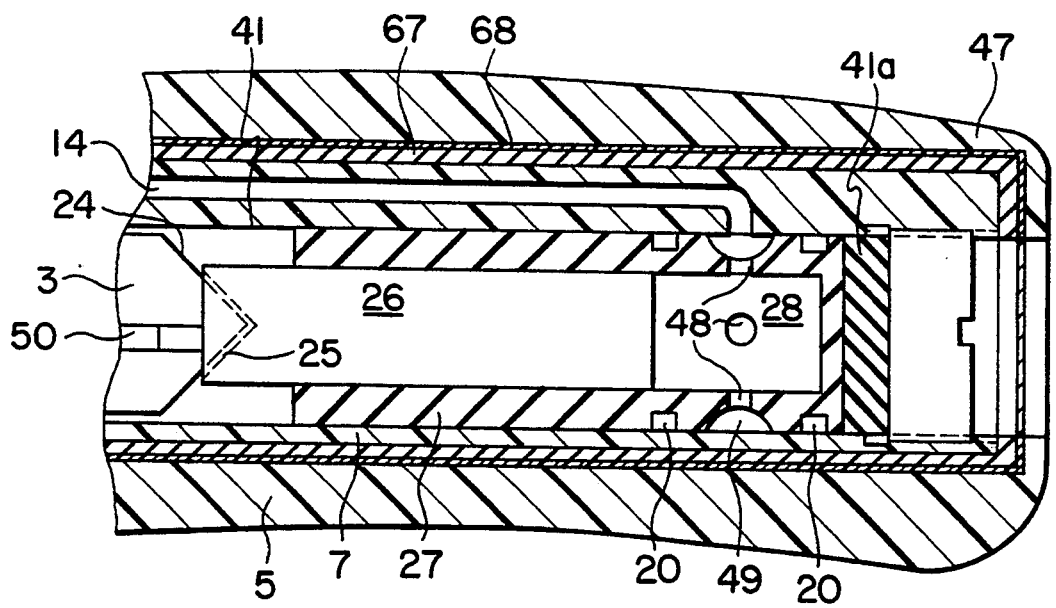
FIG. 5 shows a section through the knife handle at the end.

The working area (28) of the working cylinder is connected by a first channel (14) provided in the handle (5) with a connection (13a) for an oil pressure line (29). The connection (13a) is located at the front in the handle (5) of the knife, namely above the back (9) of the blade (2), for example at the end face, in order to permit the knife (1) to be grasped above the end of the handle. The oil pressure line (29) is led to a driving device (not shown). The first channel (14) opens in the rear part (47) of the handle (5) into an annular depression (49) of the cylinder (27), which is connected via a second channel (48) with the working area (28) of the working cylinder (27). This configuration permits the working cylinder (27), rotated around its axis, to be placed in any position in the handle (5). As shown in FIG. 5, the annular depression (49) is sealed off against the gap between working cylinder (27) and first mount (41) by means of sealing rings (20) (O-rings) located on either side of the depression (49). This configuration guarantees that no oil penetrates into this gap, not even when the working cylinder makes slight vibratory movements in axial direction.

A second mount (44) is provided for the guide (4) of the tang (3). First and second mounts (41, 44) and threaded opening (7) are rigidly connected with one another.

As the blade (2) of the knife (1) has to be very frequently reground and accordingly becomes unserviceable after a certain time, a rapid-action coupling (15) is provided in the oil pressure line (29) between the drive provided in the knife handle and the actual drive provided separately from the knife, in order to be able to detach the knife (1) easily from the separately provided driving device (not shown) for the piston (26) of the working cylinder. For the blades (2) are not removed from the knife (1) for the grinding operation for safety reasons, so that the knife with its drive has to be detached from the actual driving device. An electric switch is provided on the handle (5), which switch acts on the separately provided driving device for the piston (26) in the knife handle (5).

As can be recognized in FIGS. 4a and 4b, the rear part (47) of the knife handle (5) corresponds in its length and configuration to a conventional knife handle. The shell (51) of the handle has, however, a widening (46) towards the blade. This serves as a thumb rest when using the knife and simultaneously prevents any slipping of the hand or of a finger beyond the start of the handle into the area of the moving blade. This enhances safety when using the knife. The widening (46) of the shell (51) of the handle is not compulsory. Other configurations can be provided for this purpose.

The rear part (47) of the knife handle (5) complies in its length and configuration with a conventional knife handle for a knife with a non-moved blade. The widening extends the conventional handle configuration slightly. The extension has an advantageous effect on the extension of the tang (3) in the guide (4).

Figure 2:
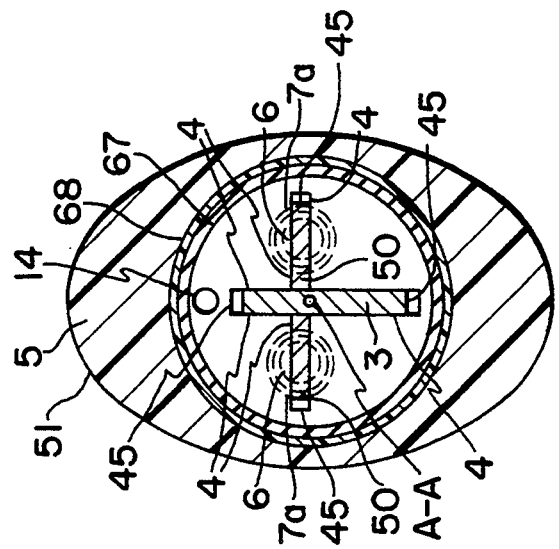
FIG. 2 shows a section along line II—II of FIG. 1.
Figure 3:
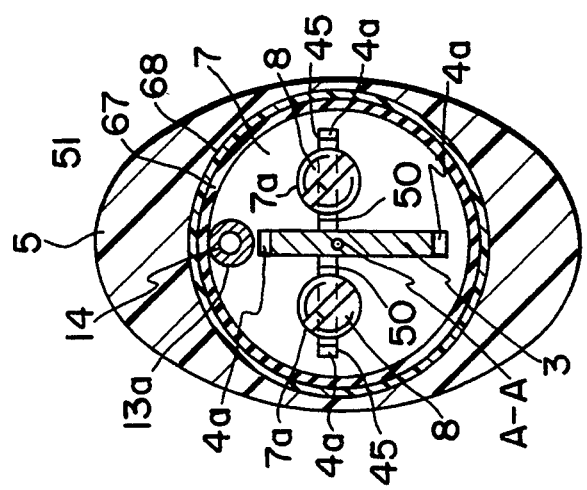
FIG. 3 shows a section along line III—III of FIG. 1.

As revealed by FIG. 1, the tang (3) is supported centrically in the recess (25) of the piston (26), i.e. along the central line (A—A). The parts positioned on either side of the central line (A—A) of the tang (3), namely the wings (50) are, as shown in FIG. 3, placed asymmetrically to the central line (A—A). A corresponding configuration is shown by the guide (4) for these parts. The effect of this measure is that the blade (2) with the tang (3) can be pushed into only one quite specific position in the handle (5) of the knife (1), with a consequent increase in operating safety. The guide (4) holds the cruciform configuration of the tang (3) with an exact fit. Any tilting of the blade (2) in the plane of projection or perpendicular to it is impossible on account of the cruciform configuration of guide and tang. The cruciform configuration (3, 50) of the tang (3) is provided only in the rear part of the tang (3). Cruciform openings (4a) are shown in FIG. 2.

The knife handle (5) and its individual parts for the drive of the knife and also the knife with tang itself have a natural frequency which is outside, advantageously far outside, the drive frequency for the piston, namely for the entire driving range. In this way, resonance phenomena are avoided.

As the design also dampens vibrations to a large extent, the knife is very steady in the hand when in use.

An embodiment of the separately provided driving device could include cylinder (10), automatic oil refill device (11), venting device (12), and oil line connection (13).

Alternatively, a detachable connection is provided between the blade (2) and the tang (3), wherein the detachable connection is a well-known type of connection. An example of the knife (1) with a detachable connection is shown according to FIGS. 6 and 7. The blade (2) of the knife (1) is provided with tang (3) consisting of two parts which are connected readily detachably from each other. The tang (3) has for this purpose an extension with a blade mount (56) into which the blade neck (52) is introducible without clearance. Blade (2) and blade neck (52) consist of one piece. The blade mount (56) has a threaded drilled hole (59) for a fastening screw (58) which is initially insertable through the drilled hole (59) in the handle (5) of the knife. The fastening screw (58) engages the blade neck (52) and the blade mount (56).

When the screw (58) is screwed into the blade mount (56) and engages the blade neck (52), blade (2) and tang (3) are firmly connected with each other.

Figure 6:
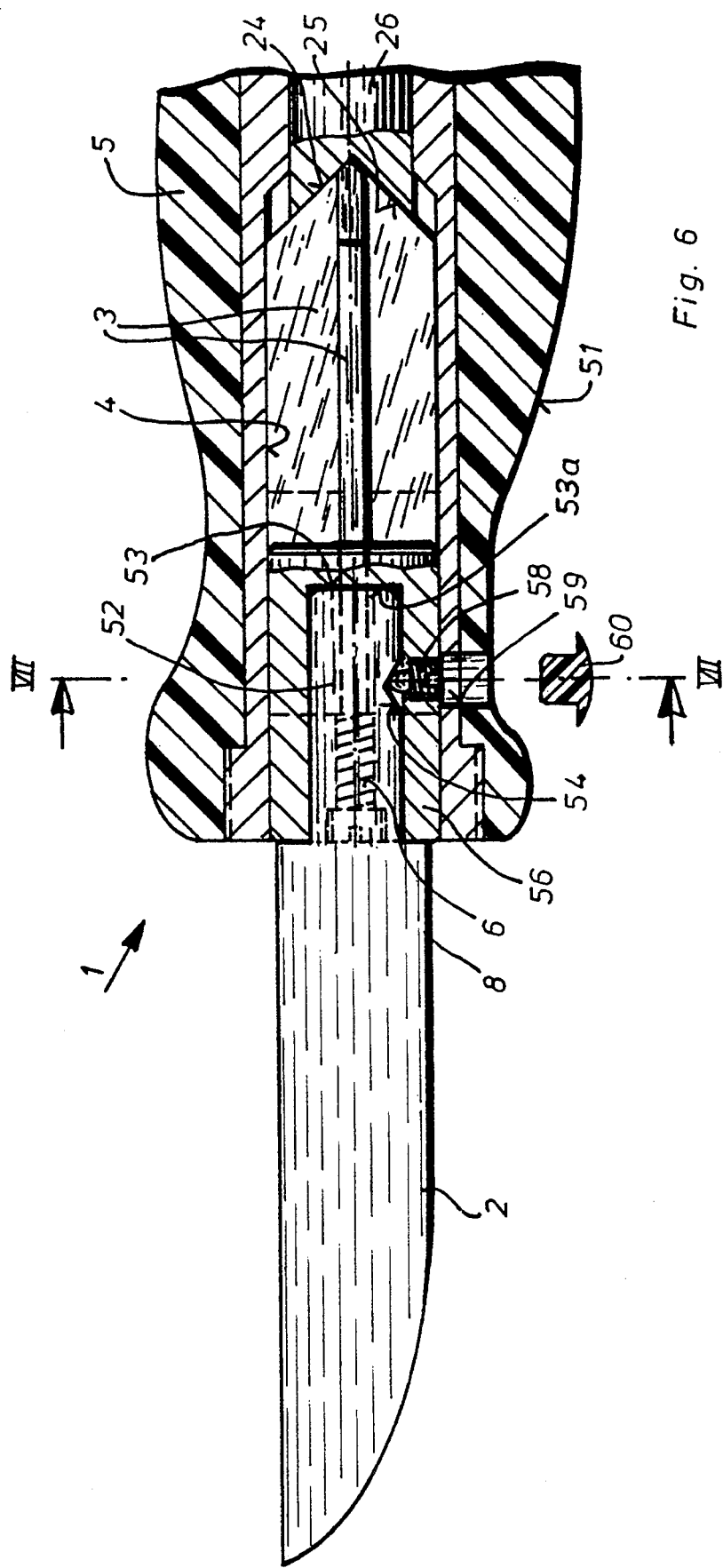
FIG. 6 shows an alternate embodiment of the knife in longitudinal section.
Figure 7:
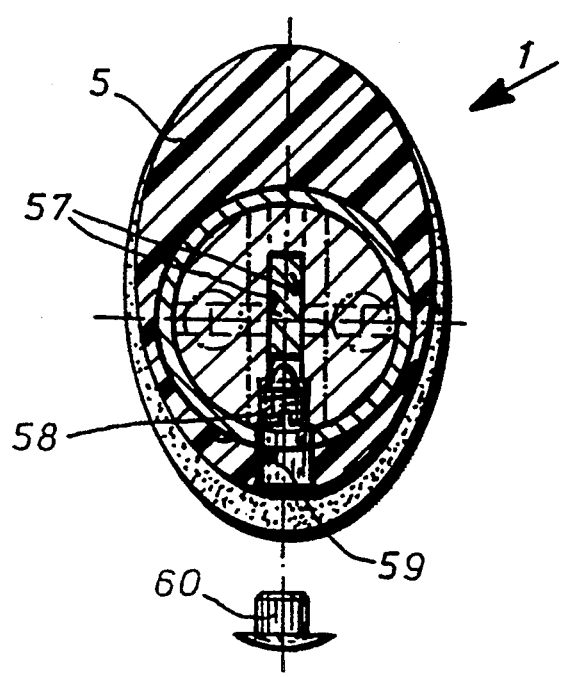
FIG. 7 shows a section along line VII—VII of FIG. 6.

When the screw (58) has been unscrewed, it can be taken out of the drilled hole (59) for the screw control, and the blade (2) can be readily withdrawn to the left from the blade mount (56) in FIG. 6. In order that the drilled hole (59) for the screw control, which is provided in the handle (5) of the knife, is not soiled, a plug (60) can be pressed into the drilled hole (59). When necessary this plug (60) is readily removable.

When the screw (58) is screwed in so that it connects the blade (2) and the tang (3) firmly with each other, tang (3) and blade (2), including the blade mount (56) can be moved forward and back together in the knife handle (5).

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:
1. A knife comprising:
  a handle including a guide and at least one piston;
  a blade moveable in rapid succession relative to the handle, wherein the blade includes a tang which is moveable to and fro in an axial direction in the guide of the handle by the piston, the tang having wings and being supported with its rear part on the piston driven by a pressure medium; and
  at least one counterpressure spring supported with one end on at least one wing of the tang and with an opposite end on a portion connectable with the handle;
  wherein the portion has at least one opening for the insertion of at least one spring into the handle, as well as means for closing the opening.

2. The knife according to claim 1, wherein the wings are positioned perpendicular to a surface of the tang.

3. The knife according to claim 1, wherein the guide for the tang is longer than the wings of the tang.

4. The knife according to claim 1, wherein the tang, including the wings, tapers at its rear end centrically to a central axis of the tang, and the piston has on its end face a tapered recess to hold the tapered end of the tang.

5. The knife according to claim 4, wherein operating elements include the tang, the guide, the counterpressure spring, the tapered end of the tang, the tapered recess, the piston, and a working cylinder in which the piston moves; and
wherein the operating elements are embedded in a rubbery casing.

6. The knife according to claim 5, wherein the rubbery casing is enclosed in a plastic skin connected with the casing.

7. The knife according to claim 6, wherein the plastic skin is food-compatible.

8. The knife according to claim 6, wherein a shell of the handle, together with the casing and the plastic skin, waterproofs the operating elements.

9. The knife according to claim 1, wherein two counterpressure springs are provided, one of them positioned on one side of the tang and the other on the other side of the tang.

10. The knife according to claim 1, wherein the guide embeds the tang with wings, with an exact fit in cross-section.

11. The knife according to claim 1, wherein supports are provided for the at least one counterpressure spring, whose distance from one another corresponds approximately to the length of the spring in an initial state.

12. The knife according to claim 1, wherein the at least one opening includes a threaded fitting which has at least one threaded hole for at least one grub screw for supporting the opposite end of the counterpressure spring.

13. The knife according to claim 12, wherein the diameter of the threaded hole is greater than the diameter of the counterpressure spring.

14. The knife according to claim 12, wherein the threaded hole for a grub screw is provided on either side of the tang, respectively.

15. The knife according to claim 12, wherein the handle has a first mount for a working cylinder holding the piston and a second mount for the guide of the tang, and wherein the threaded fitting and the first and second mounts are rigidly connected with one another.

16. The knife according to claim 15, wherein the blade is hydraulically driven; and
wherein a first channel is provided in the handle connecting a rear part of the working cylinder with a front part of the handle, which first channel emerges from the handle above a back of the blade.

17. The knife according to claim 16, wherein the handle bears at the first channel's point of emergence a connection for an oil pressure line.

18. The knife according to claim 16, wherein the first channel emerges from the handle on an end face side.

19. The knife according to claim 18, wherein the working cylinder has at its rear end an external annular depression which is connected via at least one second channel with an internal compartment of the working cylinder; and
wherein the first channel opens into the annular depression.

20. The knife according to claim 19, wherein the annular depression is sealed off on either side by sealing rings against a gap between the working cylinder and the first mount.

21. The knife according to claim 1, wherein the counterpressure spring is a helical spring.

22. The knife according to claim 1, wherein the counterpressure spring is a cup spring.

23. The knife according to claim 1, wherein an easily detachable connection is provided between blade and tang.

24. The knife according to claim 1, wherein the at least one opening is an essentially cruciform opening for emergence of the tang with wings.

25. The knife according to claim 1, wherein the guide for the tang is lined with a blocking-resistant plastic material.

26. The knife according to claim 25, wherein the wings are lined with the blocking-resistant plastic material.

27. The knife according to claim 26, characterized in that the plastic material is TEFLON ®.

28. The knife according to claim 1, wherein said at least one counterpressure spring keeps the tang in constant contact with the piston by pressing against the wings of the tang.

29. The knife according to claim 1, wherein said at least one counterpressure spring is easily removable for replacing the blade.

30. The knife according to claim 1, wherein the wings are integrally formed with the tang.

31. The knife according to claim 1, wherein the counterpressure spring comprises a pressure device which exerts pressure in a direction opposite to the direction of pressure exerted by the piston in a working cylinder.

32. The knife according to claim 1, wherein a natural frequency of the knife and of its individual parts, including the blade, the tang, the guide, the handle, the counterpressure spring, the piston, and a working cylinder in which the piston moves, is substantially above a range of a drive frequency of the piston.

33. The knife according to claim 1, wherein the handle complies in its size and external form approximately with the handle of a hand-held butcher's knife with a rigid blade.

34. The knife according to claim 33, wherein a shell of the handle has towards the blade a widening serving as a finger and hand protection.

35. The knife according to claim 34, wherein the handle is extended towards the blade and the extension is said widening.

36. The knife according to claim 1, wherein an electric switch is provided on the handle, which switch acts on a separately provided driving device for the piston in the knife handle.

37. The knife according to claim 1, wherein the blade is moveable in an even, oscillating movement.

38. The knife according to claim 1, wherein the blade and tang are of a rigid, one-piece construction.

39. The knife according to claim 1, wherein the wings, along with the tang, transmit to the counterpressure spring, which evenly absorbs, pressures exerted on the blade.

40. The knife according to claim 1, wherein both the guide and the tang with wings sliding in it form an asymmetric cross in cross-section.

41. The knife according to claim 40, wherein the asymmetric cross configuration limits insertion of the blade into the handle to but one orientation.

42. A knife comprising:
a handle including a guide and a piston;
a blade moveable in rapid succession relative to the handle, wherein the blade includes a tang which is moveable to and fro in an axial direction in the guide of the handle by the piston, the tang having wings and being supported with its rear part on the piston driven by a pressure medium; and at least one counterpressure spring supported with one end on an end of at least one wing of the tang and with an opposite end at a threaded fitting of the handle;

wherein the threaded fitting has at least one threaded hole for at least one grub screw for supporting the opposite end of the counterpressure spring;

wherein the handle has a first mount for a working cylinder holding the piston and a second mount for the guide of the tang, and wherein the threaded fitting and the first and second mounts are rigidly connected with one another; and wherein the working cylinder is held non-rigidly in the first mount in an axial direction.

43. The knife according to claim 42, wherein the working cylinder is supported in an axial direction on a flexible element.

44. A knife comprising:

a handle including a guide and at least one piston;

a blade moveable in rapid succession relative to the handle, wherein the blade includes a tang which is moveable to and fro in an axial direction in the guide of the handle by the piston, the tang having stay bolts and being supported with its rear part on the piston driven by a pressure medium; and at least one counterpressure spring supported with one end on at least one stay bolt of the tang and with an opposite end on a portion connectable with the handle;

wherein the portion has at least one opening for the insertion of at least one spring into the handle as well as means for closing the opening.

45. The knife according to claim 44, wherein the at least one opening is an essentially cruciform opening for emergence of the tang with stay bolts.

* * * * *